Figure 5:
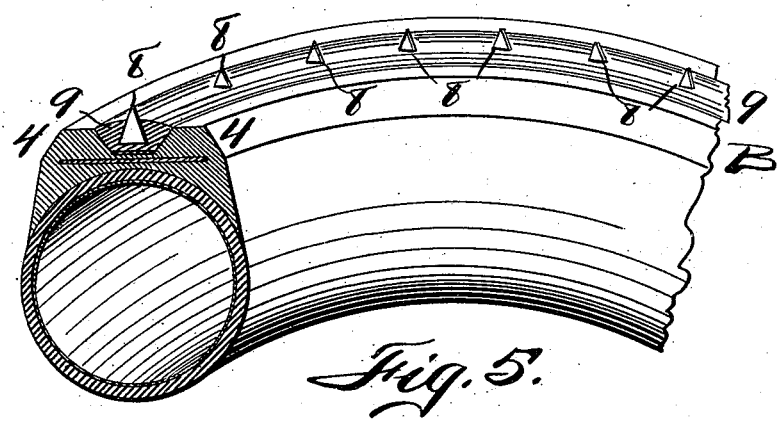

(No Model.) 2 Sheets—Sheet 1.
M. A. ANDREWS.
VEHICLE TIRE PROTECTOR.
No. 574,772. Patented Jan. 5, 1897.
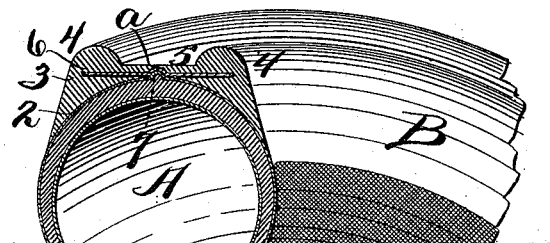
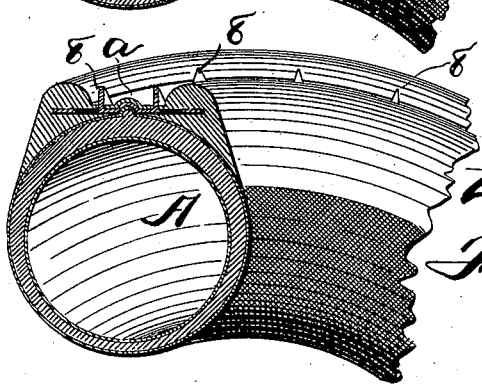
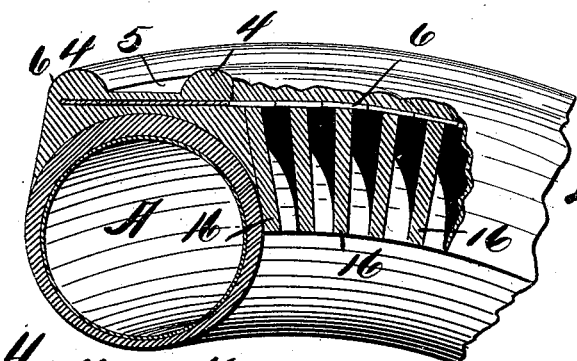
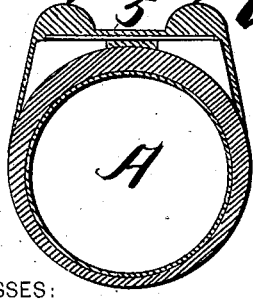
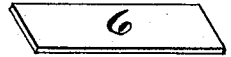
WITNESSES:
Charles W. Morvin
Jessie E. Murray
INVENTOR
Marion A. Andrews
BY
Smith & Simson
ATTORNEYS.
THE NORRIS PETERS CO., PHOTO-LITHO., WASHINGTON, D. C.

(No Model.) 2 Sheets—Sheet 2.

M. A. ANDREWS.
VEHICLE TIRE PROTECTOR.

No. 574,772. Patented Jan. 5, 1897.

WITNESSES:
Charles W. Morris
Jessie E. Murray

INVENTOR
Marion A. Andrews.

BY
Smith & Brown
ATTORNEYS.

UNITED STATES PATENT OFFICE.

MARION A. ANDREWS, OF SYRACUSE, NEW YORK.

VEHICLE-TIRE PROTECTOR.

SPECIFICATION forming part of Letters Patent No. 574,772, dated January 5, 1897.

Application filed January 30, 1896. Serial No. 577,381. (No model.)

*To all whom it may concern:*

Be it known that I, MARION A. ANDREWS, of Syracuse, in the county of Onondaga, in the State of New York, have invented new and useful Improvements in Vehicle-Tire Protectors, of which the following, taken in connection with the accompanying drawings, is a full, clear, and exact description.

My invention relates to vehicle-tires of the class known as "hollow," "tubular," or "pneumatic," and particularly to means for protecting them from being punctured, at the same time adding to or increasing the resiliency of the tire and also providing it with means whereby it is better adapted to travel over ice and snow.

My object is to produce a tire-protector adapted to be mounted upon any known tire, single or double tube, embodying a suitable backing, as canvas, a rubber body vulcanized thereon, flat spring-metal plates closely abutting at their edges vulcanized into said body, parallel ribs, which constitute the tread of the tire and which are substantially in alinement with the outer ends of said plates, which are upon a line tangential to the tire proper or parallel to such a line, their outer ends being yieldingly and elastically supported by a solid body of rubber between them and the tire-body, or by separate pieces, all in such manner that the weight of the rider is wholly carried by the circumferential ribs, and these are more or less compressed, and their compression bends the ends of the plates inwardly and elastically, the rubber cushions under said ends yielding, so that not only the elasticity or resiliency of the tire is not impaired or reduced, but by the spring of said plates is increased. For ice and snow the plates, or part of them, are provided with spurs which project beyond the face of the protecting-strip and between said ribs, either integral with said plates or detached therefrom, and either vulcanized into said protecting-strip or into an auxiliary band which will lie between said ribs around the periphery of the strip and be held in place by said ribs and such other means or appliances as may be deemed advisable, and in either case the spring action of the puncture-proof plates reinforces that of the strip itself and increases the resiliency of the tire.

My invention consists in the several novel features of construction and operation hereinafter described and which are specifically set forth in the claims hereunto annexed. It is constructed as follows, reference being had to the accompanying drawings, in which—

Figure 6:
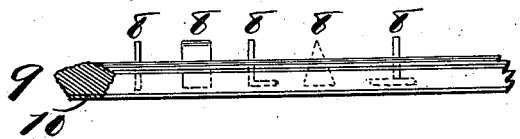
Figures 14, 15, 16, 17:
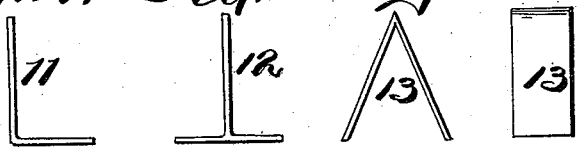
Figure 18:
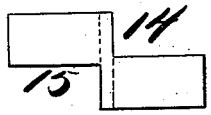

Figure 1 is a transversely sectional elevation of a piece of a tire and the protector secured thereon. Fig. 2 is a like view of the same provided with spurs for ice and snow. Fig. 3 is a like view of the same, partly broken away to show the ends of the protecting-plates and a series of lateral brackets or separate plate-supports. Fig. 4 is a transverse section of Fig. 3. Fig. 5 is a transversely sectional elevation of a piece of tire with protector and having an auxiliary band mounted between the peripheral ribs of the protector in which the spurs for ice and snow are secured. Fig. 6 is a plan perspective of a piece of said band detached, showing several different styles of spurs vulcanized therein. Fig. 7 is a top plan of one of the protecting-plates shown in Figs. 1 and 2. Fig. 8 is a top plan of a blank cut out to create a spur-plate. Fig. 9 is a side elevation of the same after it has been swaged or bent centrally to create a spur-tooth. Figs. 10 and 11 are respectively a top plan and a side elevation of a plate having spurs stamped out and standing in lines transverse to the plate. Figs. 12 and 13 are like views of a plate in which the spurs are longitudinal to it. Fig. 14 is a side elevation of an L-shaped spur for the auxiliary band. Fig. 15 is a like view of a T-spur for the same. Figs. 16 and 17 are respectively a side and a front elevation of a V-shaped spur for the same. Fig. 18 is a bottom plan of a spur-plate having spur-teeth stamped up out of opposite corners, as shown by the dotted lines. Fig. 19 is a plan perspective of the protecting-plate shown in Figs. 3 and 4.

A is any ordinary tubular tire, which may be either of the single or double tube type.

B is the tire-protector, consisting of a suitable backing 2, upon which the body 3 is mounted, having parallel ribs 4 outwardly projecting and creating an annular peripheral recess 5, and 6 represents flat spring sheet-metal protecting-plates suitably vulcanized into said body, being placed edge to edge, and all being in planes tangential to the periphery, or at a right angle to a diametrical secant projected from the axle of the wheel through the tire. These plates may be either plane or provided with a transverse swell $a$, the concavity of which receives the backing and fits over a rib 7 around the tire as a preventive of lateral displacement of the protector, which is cemented or otherwise secured onto the tire. This protector is usually endless and is applied with cement to the deflated tire, and then by its inflation the protector is seated thereon.

For ice and snow I combine spurs 8 with the protector either by cutting out opposite edges, as in Fig. 8, and then bending or swaging it into the form shown in Fig. 9, or by stamping them out, as shown in Figs. 10, 11, 12, and 13. In Fig. 11 the spurs are edgewise to the line of the strain thereon when in use, while in Fig. 13 they are transverse thereto. These plates with spurs are vulcanized in place with the spurs projecting into the recess 5 a suitable distance; or for ice and snow I can construct the protector as in Figs. 1, 3, or 4 and use an auxiliary band 9, of suitable shape in cross-section to fit the recess 5, which can be endless, placed around the deflated tire, and when this is inflated it becomes suitably seated in place. This band comprises a suitable backing 10, a body thereon, and suitable spurs vulcanized therein, the spur 11 being L-shaped, the spur 12 being T-shaped, the spur 13 being V-shaped, and the spur 14 being of a double L shape, the spurs being struck up with suitable dies from opposite corners of the plate 15; or the spurs may be struck up as in Figs. 11 and 13.

In Figs. 1 and 2 the body 3 is shown as solid under the outer ends of the plates, while in Figs. 3 and 4 this body is shown as broken up into separate supports 16, like unto brackets, suitably inclosed and bearing inwardly against the tire. It will be seen that the ribs 4 carry the greater part of the load and are of resilient material, as rubber, as also is the entire body of the protector, and that the spring-plates when under pressure are bent inwardly at their ends, spring back when the pressure is removed, and thus add to or increase the resilient action of the protecting-strip, and also that of the tire itself, particularly when the bracket-supports are used as shown in Fig. 3. It will also be seen that the solid body can be used for heavy riders, while the bracket construction can be used by those of lighter weight, and in either case the spring action of the plates is the same, and also this is true when the spurs are used integral with the plates or when used as vulcanized into the band.

Having described my invention, what I claim, and desire to secure by Letters Patent, is—

1. A protector for vehicle-tires, comprising a suitable backing, a body thereon, straight transverse spring-plates in said body and parallel ribs upon the exterior of said body, all vulcanized together, whereby the compression of said ribs produces a spring action of said plates.

2. A protector for vehicle-tires, comprising a suitable backing, a body thereon, straight transverse spring-plates in said body, parallel ribs upon the exterior of said body, all vulcanized together and spurs projecting from said plates through said body into the space between said ribs.

3. A protector for vehicle-tires comprising a suitable backing, a body thereon, straight spring-plates within and across said body and concaved transversely, parallel ribs upon said body and constituting the tread of said protector, in combination with a tire provided with a peripheral rib fitting into said concavity when the protector is applied to said tire.

4. The combination with a tire, and a protector-strip applied thereto, provided interiorly with transverse spring-metal plates, and exteriorly with parallel flexible ribs, of an endless band mounted in the peripheral recess of said strip and consisting of a backing, a body, and projecting spurs vulcanized together.

5. A protector-strip for tubular tires comprising an endless interiorly-concaved backing, a body thereon provided with exterior parallel ribs of flexible and yielding material, creating an annular recess between them, and flat spring-metal plates having their lateral edges abutting against each other and embedded in said body and respectively lying in a plane tangential to the arc of said concavity, all vulcanized together.

6. The combination with a tubular tire of a protector against puncturing mounted thereon and comprising a suitable backing, a body divided on either side into brackets, flat plates within said body and having their outer ends resting upon said brackets, and exterior ribs interiorly bridging over the spaces between said brackets, and exteriorly projecting to create an annular recess between them and vulcanized together in any ordinary manner.

In witness whereof I have hereunto set my hand on this 28th day of January, 1896.

MARION A. ANDREWS.

In presence of—
JESSIE E. MURRAY,
HOWARD P. DENISON.